Aug. 30, 1949.  R. S. GREGOIRE  2,480,464

OIL SEAL

Filed Jan. 11, 1946

INVENTOR
Resta S. Gregoire
BY Hauke & Hardesty
ATTORNEYS

Patented Aug. 30, 1949

2,480,464

UNITED STATES PATENT OFFICE 2,480,464

OIL SEAL

Resta S. Gregoire, Highland Park, Mich., assignor of twenty per cent to Harold L. Cox and twenty per cent to John Joseph Thornton, Jr., both of Detroit, Mich.

Application January 11, 1946, Serial No. 640,400

3 Claims. (Cl. 288—3)

The present invention relates to oil seals for shafts and specifically to a self-contained fixed adjustment seal for the clearance space between a shaft and surrounding spaced sleeve or wall between which there is relative rotary movement.

Among the objects of the invention is a seal for such spaces capable of being installed as a unit.

Another object is a seal of the type indicated which is capable of sealing even where there is an eccentric condition.

Still other objects will readily occur to those skilled in the art upon reference to the following description and the accompanying drawings in which Figure 1 is a diametral section of a seal made according to the present invention and arranged for mounting in the surrounding wall.

Figure 1:
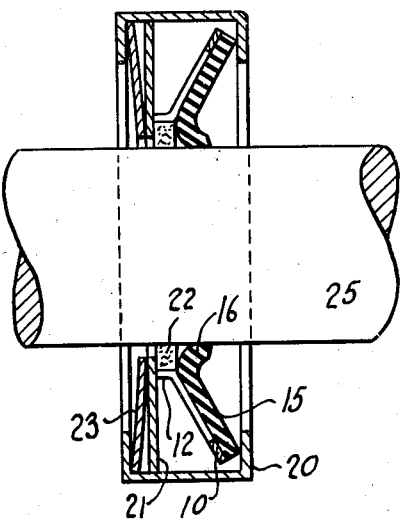

In the drawings, the seal is indicated as comprising a Belleville washer 10, which is a frusto-conical washer, preferably made of spring steel or other metal although other materials such as plastic material may be used.

Figure 2:
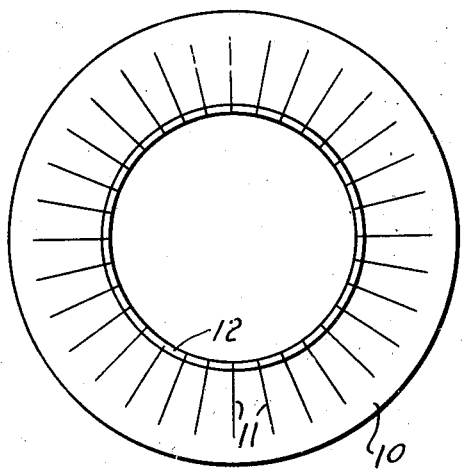
Figure 2 is an elevational view of the Belleville washer used therein.

This washer 10, in the form of seal of Figures 1 and 2, is slotted or cut radially as at 11 from the central opening to near the outer edge, there being a sufficient number of such slots to provide for sufficient flexibility to permit a small movement when pressure is applied axially of the washer.

Further, a small upstanding flange 12 is provided around the central opening.

Fixed to the inner surface of the washer, as by vulcanizing or cementing, is a frusto-conical washer 15 of suitable soft resilient material, such as rubber, or one of the so-called "synthetic" rubbers, such as neoprene or its equivalent.

This element 15 extends to the outer edge of washer 10 and beyond the inner edge, being formed to provide at its inner edge a considerable flange or lip 16 which is turned toward the base of the cone.

This sealing element so prepared is mounted in an annular retainer 20, channel shaped in cross section with an annular plate 21 having an opening enough smaller than that of the Belleville washer to permit contact of the plate 21 and the flange 12 of the washer. This provides a recess between the plate, flange 12 and lip 16 in which is placed a felt washer or ring 22.

On the opposite side of plate 21 from the washer 10 is a thin spring washer 23 adapted to contact plate 21 adjacent the central opening and contact the retainer 20 with its outer edge.

In assembling the several parts, the retainer 20 will have one of its side walls turned in after placement of the two washers and plate, and its axial dimension so determined as to compress somewhat the contained elements, axially.

The assembled seal is designed to be mounted in a surrounding sleeve or wall (not shown) with the shaft 25 extending axially therethrough.

Figure 3:
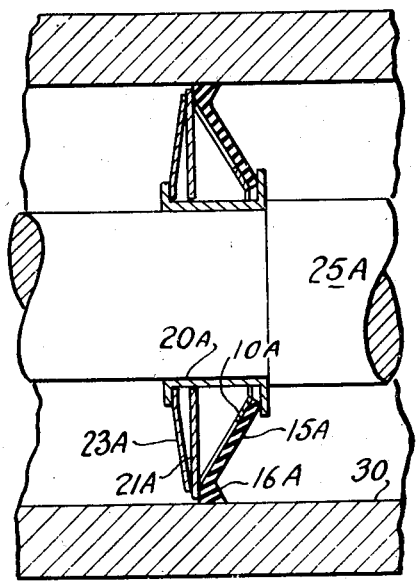
Figure 3 is a view similar to Figure 1 but of a seal mounted on the shaft.
Figure 4:
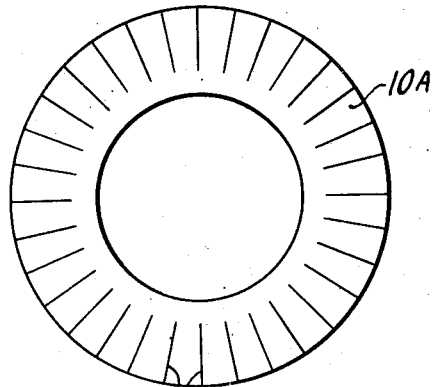
Figure 4 is an elevational view of the Belleville washer used in the seal of Figure 3.

In the form of seal shown in Figs. 3 and 4, the Belleville washer 10A is shown as without the flange 12 and slotted or cut radially as at 11A from the outside edge to near the central opening. Further, washer 15A of neoprene or other material is fixed to the outer surface of the Belleville washer 10A with the lip 16A extending beyond the outer edge.

The annular plate 21A contacts the outer edge of the Belleville washer and the spring washer 23A contacts the outer edge of plate 21A and the wall of the channeled retainer ring 20A which in this form is in the central openings of the several parts.

This form of seal is designed to be pressed over a shaft 25A and lip 16A to contact a surrounding sleeve or wall 30. In this form, as in the other, in the assembling of the several parts, the three inner members are compressed axially.

Now having described the invention and the preferred embodiment thereof, it is to be understood that said invention is to be limited, not to the specific details herein set forth, but only by the scope of the claims which follow:

I claim:

1. An oil seal consisting of a frusto-conical spring washer having fixed to one face a frusto-conical element of relatively soft resilient material having at one edge a lip portion extending beyond the adjacent edge of the washer, an annular plate contacting said adjacent edge of said washer, a spring washer contacting said plate and a channeled retaining ring embracing the juxtaposed edges of the washers and plate and adapted to maintain these in an axially compressed condition.

2. An oil seal consisting of a frusto-conical spring washer having fixed to its inner face a frusto-conical element of relatively soft resilient material with its inner edge forming a lip portion extending beyond the adjacent edge of said washer, an annular plate contacting the inner edge of said washer, a spring washer contacting said plate adjacent its inner edge and a channeled retaining ring embracing the outer edges of said washers and plate and maintaining these in axially compressed condition.

3. An oil seal consisting of a frusto-conical spring washer having an axially extending flange at its inner edge and having fixed to its inner face a frusto-conical element of relatively soft resilient material with its inner edge forming a lip portion extending beyond the adjacent edge of said washer, an annular plate contacting the said flange and extending therebeyond whereby to form a recess between said plate, flange and lip portion, a spring washer contacting said plate adjacent its inner edge, a felt washer in said recess and a channeled retaining ring embracing the outer edges of said washers and plate and maintaining these in axially compressed condition.

RESTA S. GREGOIRE.

REFERENCES CITED

The following references are of record in the file of this patent:

UNITED STATES PATENTS

| Number | Name | Date |
|---|---|---|
| 1,652,747 | Van Rijswijk | Dec. 13, 1927 |
| 1,850,566 | Roed | Mar. 22, 1932 |
| 2,264,413 | Siegerist | Dec. 2, 1941 |